United States Patent Office 2,863,917
Patented Dec. 9, 1958

2,863,917

METHOD FOR REDUCING DICHLOROACETIC ACID IN THE PRESENCE OF MONOCHLOROACETIC ACID

John T. Rucker, Lewiston, and James S. Sconce, Niagara Falls, N. Y., assignors to Hooker Chemical Corporation, Niagara Falls, N. Y., a corporation of New York No Drawing. Application March 31, 1954
Serial No. 420,188

9 Claims. (Cl. 260—539)

This invention relates to the selective reduction of dichloroacetic acid to monochloroacetic acid while in the presence of monochloroacetic acid without concurrently reducing the monochloroacetic acid to acetic aid. More particularly, this invention relates to a novel and surprising method for reducing the dichloroacetic acid content of commercial monochloroacetic acid by selectively reducing the dichloroacetic acid to monochloroacetic acid with hydrogen gas in the presence of a group VIII noble metal.

In certain processes for the commercial chlorination of acetic acid or anhydride to form monochloroacetic acid, there is also produced a significant amount of dichloroacetic acid ranging between two and ten percent by weight of the commercial monochloroacetic acid. This quantity of dichloroacetic acid in the monochloroacetic acid is an objectionable impurity in many uses. Further the dichloroacetic acid in the commercial monochloroacetic acid is an undesirable diluent of the product; and moreover, may be harmful in some of the ultimate uses for the monochloroacetic acid. This is especially so where the monochloroacetic acid is used as an intermediate for the production of materials in which dichloroacetic acid may be an impurity which causes undesirable side reactions and dilutes the total effect of the monochloroacetic acid in the reaction. Thus, it has become important that commercial monochloroacetic acid be low in dichloroacetic acid content and it is an objective of this invention to provide a method which selectively reduces the dichloroacetic acid content of commercial monochloroacetic acid, that is, without the concomitant reduction of substantial amounts of monochloroacetic acid to acetic acid. A second objective is to provide a method which is easily adaptable to present commercial processes for producing monochloroacetic acid. A third object is to provide a method for purifying commercial monochloroacetic acid of its dichloroacetic acid content. A fourth object is to provide a method for selectively reducing dichloroacetic acid to monochloroacetic acid while in the presence of monochloroacetic acid, and without at the same time also reducing the monochloroacetic acid to acetic acid.

To remove the dichloroacetic acid from commercial monochloroacetic acid is not as simple a problem as one might expect it to be. Almost identical boiling points rule out fractional distillation as a means of separation. Purification of monochloroacetic acid by re-crystallization entails the expense of an auxiliary solvent, such as carbon tetrachloride, to separate the dichloroacetic acid mother liquor containing dichloroacetic acid from the monochloroacetic acid crystals. Considerable loss of monochloroacetic acid occurs by reason of its solubility in the mother liquor. Re-crystallization becomes increasingly uneconomical when the dichloroacetic acid tolerance is reduced below one percent dichloroacetic acid in the product.

We have now found that dichloroacetic acid can be selectively reduced while in the presence of monochloroacetic acid, that is without the concomitant reduction of substantial amounts of monochloroacetic acid, by the process which comprises: bubbling hydrogen gas into a liquid mixture of monochloroacetic acid and dichloroacetic acid maintained at a temperature between about 60 and about 170 degrees centigrade while in the presence of a group VIII noble metal hydrogenation catalyst having an atomic number greater than 43, and recovering the product therefrom.

We have also found that commercial monochloroacetic acid can be lowered in, or purified of, its dichloroacetic acid content without at the same time also reducing substantial amounts of monochloroacetic acid to acetic acid, by the process which comprises: maintaining the commercial monochloroacetic acid in agitation in the presence of between about 0.02 and about 2.4 percent by weight of a deposited catalyst of palladium on an inert carrier and at a temperature between about 130 and about 150 degrees centigrade, introducing hydrogen gas into the commercial monochloroacetic acid, and recovering the monochloroacetic acid product so produced.

The dichloroacetic acid is removed presumably in accordance with the following equation:

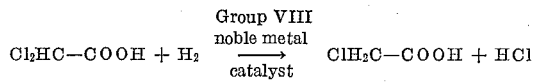

We have found that the choice of the hydrogenation catalyst is restricted to noble metals in group VIII of the periodic table, which have an atomic number greater than 43. These metals are ruthenium, rhodium, palladium, osmium, iridium and platinum whose atomic numbers are 44, 45, 46, 76, 77 and 78, respectively. Further, we have found palladium to be the most satisfactory of these catalysts, as well as being one of the least expensive of these particular elements. Other hydrogenation catalysts investigated such as powdered iron, metallic zinc, Raney nickel, cobalt, activated carbon and ultraviolet light, have not been found to be adaptable to the method of the present invention because none of these materials, which are generally considered to be hydrogenation catalysts, exhibited the necessary requirements of efficiency in catalyzing the hydrogen reduction. Further, these other materials were very susceptible to catalyst poisoning and chemical attack by the chemicals present during the hydrogenation; and the resultant product contained undesirable decomposition products and gave a discolored, impure, product monochloroacetic acid. For instance, reduction with powdered iron catalyst only slightly lowered the dichloroacetic acid content and formed appreciable quantities of undesirable residues; reduction with metallic zinc gave no improvement in the dichloroacetic acid content; attempted use of Raney nickel and cobalt both showed rapid chemical attack on these metals; and activated carbon as well as ultraviolet light failed to function as hydrogenation catalysts over a wide range of temperatures.

The catalysts to be used in the method of this invention are most effective when they are deposited on an inert carrier such as activated alumina, activated charcoal or kieselguhr preferably in a finely divided state. The amount of group VIII noble metal deposited on the carrier may be varied within wide ranges without materially effecting the reaction. We prefer to use a carrier of powdered charcoal with palladium deposited thereon in the amount of about 5 percent by weight. After treatment of the commercial monochloroacetic acid, the catalyst on the inert carrier, or "deposited catalyst," is removed from the molten liquid by filtration. Such deposited catalysts are available in commercial forms ranging from one to twenty percent of the noble metal deposited on the inert carrier.

The concentration of the catalyst to be used during the hydrogen reduction may also be varied within wide ranges without materially effecting the reaction. In general, a catalytic amount is all that is required. Catalyst concentrations containing between about 0.0002 and about 0.5 percent by weight of the metal based on the weight of the commercial monochloroacetic acid have been found to be effective. We have found there is little change in the rate of reduction when the deposited catalyst concentration (based on the total weight of 5 percent palladium plus 95 percent charcoal powder) is varied between 0.2 percent and 2.4 percent of the commercial monochloroacetic acid to be treated, but at deposited catalyst concentrations below 0.2 percent the reaction rate drops correspondingly and longer times for treatment are needed. However, at concentrations below 0.2 percent the selectivity of the hydrogen for dichloroacetic acid rather than monochloroacetic acid is not adversely effected by these longer treating times; thus, where the additional time required in the process is a negligible factor, concentrations of the deposited catalyst as low as 0.004 percent can also be used satisfactorily for effecting the method of this invention. When desirable, deposited catalyst concentrations as high as 10 percent may also be used.

We have also found the catalyst may be re-used many times with very little reduction in its activity. And further we have found that when the catalyst finally does lose a substantial amount of its activity, it can be re-activated by water washing, and heating to a dull redness under an inert atmosphere. In washing the catalyst most of the water soluble impurities are removed. After washing it may be desirable to first dry the catalyst at a temperature between about 100 and about 250 degrees centigrade to remove any residual water; however, where the catalyst has been washed on a filter, the small amount of moisture held in the catalyst cake may be low enough to not need a separate drying step before heating to dull redness. In heating the washed spent catalyst to a dull redness an inert atmosphere of such gases as nitrogen or carbon dioxide, should be maintained over the catalyst in order to prevent oxidation and deterioration of the catalyst and its inert carrier when a carrier is used. Upon reaching a dull redness, the catalyst is held in this temperature range for a few minutes, that is about 5 minutes. Then the heat is removed and the catalyst is allowed to cool under the inert atmosphere. In the cooled condition it is then in a reactivated condition and ready for re-use as a hydrogenation catalyst in the process of our invention. Alternatively, however, the spent catalyst inactivated after many cycles of use, may be returned to the manufacturer and credited for its metal value.

In effecting the method of this invention, the commercial monochloroacetic acid during treatment must be in liquid phase. If vapor phase treatment with hydrogen gas over a palladium catalyst is used, extensive decomposition occurs. The boiling point of commercial monochloroacetic acid is about 188 degrees centigrade.

The temperature of the molten reactants may be varied within wide ranges without departing from the scope of this invention; the reduction occurring at temperatures between about 60 degrees centigrade and about 170 degrees centigrade. At atmospheric pressure the overall rate of hydrogen reduction increases with the temperature, the reaction rate being about five times as fast at 130 degrees centigrade as at 80 degrees centigrade and about twice as fast at 150 degrees centigrade as at 130 degrees centigrade. The maintenance of a constant temperature is not necessary but may be used. At temperatures near about 60 degrees centigrade, which is the appoximate melting point of commercial monochloroacetic acid, the reaction rate becomes quite low. Operating at temperatures above about 170 degrees centigrade enhances the risks of accelerated corrosion and thermal decomposition. In any event the upper temperature limit must be below the boiling point of the liquid mixture. We prefer to effect the hydrogen reduction at temperatures between about 130 degrees centigrade and about 150 degrees centigrade.

The amount of hydrogen gas to be used, in general, should be at least the theoretical amount necessary to reduce the objectional amount of dichloroacetic acid to monochloroacetic acid and an excess is preferable to further reduce any unreacted dichloroacetic acid and to eliminate free hydrogen chloride from the molten monochloroacetic acid. Twelve-fold excesses of hydrogen gas have been used without adversely effecting the reduction. In general, when hydrogenating commercial monochloroacetic acid materials which contain over two to three percent dichloroacetic acid, for instance, 10 percent dichloroacetic acid, if it is desired to have a final product containing about two to three percent dichloroacetic acid, a total evolution of about 0.9 mole of hydrogen chloride per mole of dichloroacetic acid originally present is necessary, but a total evolution of about 1.3 moles HCl per mole of dichloroacetic acid originally present is required to reduce the dichloroacetic acid content to nil. And, in general, when hydrogenating commercial monochloroacetic acid materials which contain two to three percent dichloroacetic acid, when the theoretical quantity of hydrogen chloride has been evolved, the dichloroacetic acid content will have dropped to about one percent and by continuing the reaction until twice the theoretical quantity of hydrogen chloride has been evolved, the dichloroacetic acid content will be reduced to nil. In the latter case, there is formed a quantity of acetic acid molecularly equivalent to the dichloroacetic acid originally present, while the resultant quantity of monochloroacetic acid remains unchanged. Also where it is desired to only partially reduce the dichloroacetic acid content contained in, or in the presence of, monochloroacetic acid, less than one mole of hydrogen chloride evolved per mole of dichloroacetic acid originally present would be necessary.

It is important for the molten commercial monochloroacetic acid to be under agitation during the hydrogenation reaction. The reaction slows down appreciably without some agitation of the liquid. The agitation may be accomplished by gaseous bubbling as well as mechanical mixing and the combination of these is preferred.

It is a feature of this invention that the reduction of the dichloroacetic acid in commercial monochloroacetic acid can be carried out in the absence of a solvent. Although the use of a solvent would permit operation below the normal melting point of commercial monochloroacetic acid, the reaction rate would be too low for practical purposes and even if super atmospheric pressures were employed to help increase the reaction rate the process still would be uneconomical, particularly when using water to dissolve the monochloroacetic acid. It is to be understood that tolerable impurities, such as acetic acid, are not to be considered as solvents. In the method of our invention, it is indeed surprising that the monochloroacetic acid in the commercial monochloroacetic acid is substantially inert to catalytic hydrogen reduction even when in the presence of only small amounts of dichloroacetic acid, which is readily reduced, and in this respect the monochloroacetic acid might be considered to be a substantially inert solvent for reducing the dichloroacetic acid in the commercial monochloroacetic acid.

The process of this invention may be carried out at any pressure, either reduced from or increased above atmospheric pressure. However, we prefer to operate at substantially atmospheric pressure.

After hydrogenation, the product may be handled in several batch or continuous ways. The materials may be vacuum-distilled to remove most of the hydrogenated product monochloroacetic acid, leaving only a heel of residual material containing the catalyst in the vessel. The next batch of monochloroacetic acid to be hydrogenated would be charged into the vessel on top of this remaining material. After several cycles, for example about 20, or when the catalyst in the heel becomes too inactive, the heel would be removed and the inactive catalyst recovered by filtration. In another method, the hydrogenated product monochloroacetic acid may be recovered by allowing the solids to settle out and decanting the supernatant hydrogenated product monochloroacetic acid from the solids. In this procedure, the more dense inert carriers or catalyst supports, such as alumina, would be preferable for use in order to speed up the rate of settling. After settling, the hydrogenated product monochloroacetic acid as top liquor would be drawn off, such as by means of a suitably-placed well-line, and may be put through a small filter for insuurance against loss of noble metal catalyst. In still another procedure, the materials may be centrifuged to remove the catalyst from the hydrogenated product monochloroacetic acid. Here again, a more dense catalyst support may be preferable to use.

After the catalyst has been removed from the hydrogenated product monochloroacetic acid, the product may the end of the 6.5 hours the reaction was stopped, the system again purged with nitrogen, and the deposited catalyst filtered off through a medium porosity fritted glass suction filter to give a clear, colorless filtrate. The resultant product was analyzed and found to contain 1.4 percent dichloroacetic acid and 0.8 percent acetic acid.

The following table shows the results of several examples all conducted in a manner after Example 1 above. Examples 1 to 8 were conducted using fresh deposited catalyst in each example. Examples 9 to 17 show the last nine of ten substantially identical runs where the same deposited catalyst was re-used to study catalyst life and these data show that the deposited catalyst retained 75 percent of its activity after having been used ten times under the conditions shown. Example 18 shows the results where the partially inactivated deposited catalyst from Example 17 has been reactivated before further use by washing with about 100 cc. of water, drying at 200 degrees centigrade, heating to a dull redness under nitrogen blanket in an ordinary oven and cooling. In the column headings of the table, "MCA," "DCA," "HAc" and "MP" are abbreviations for "monochloroacetic acid," "dichloroacetic acid," "acetic acid" and "melting point," respectively.

Table.—The reduction of dichloroacetic acid to monochloroacetic acid in commercial monochloroacetic acid

| Example | Deposited Catalyst, Gm. | Time, Hr. | Temp., °C. | Ratio: Mole HCl Evolved/ Original Mole DCA | Starting Material | | | Product | | | |
|---|---|---|---|---|---|---|---|---|---|---|---|
| | | | | | Weight, Gm. | MCA, Percent | DCA, Percent | HAc, Percent | MCA, Percent | DCA, Percent | HAc, Percent | M. P., °C. |
| 1 | 5.3 | 6.5 | 84 | 0.9 | 315 | 95.1 | 3.2 | 0.9 | 96.3 | 1.4 | 0.8 | 59.0 |
| 2 | 5.5 | 23 | 82 | 2.0 | 319 | 95.1 | 3.2 | 0.9 | 97.0 | 0.00 | 2.0 | 61.2 |
| 3 | 7.0 | 2 | 139 | 2.1 | 292 | 96.5 | 2.8 | 0.06 | 96.9 | 0.1 | 2.0 | 60.9 |
| 4 | 0.7 | 2.5 | 140 | 1.8 | 369 | 96.5 | 2.8 | 0.06 | 97.0 | 0.3 | 1.7 | 61.6 |
| 5 | 0.08 | 13 | 140 | 1.7 | 382 | 96.5 | 2.8 | 0.06 | 98.6 | 0.00 | 0.81 | 62.2 |
| 6 | 0.34 | 4.3 | 140 | 1.8 | 342 | 96.5 | 2.8 | 0.06 | 97.6 | 0.13 | 1.4 | 61.6 |
| 7 | 0.8 | 4.7 | 130 | 1.8 | 400 | | | | | | | |
| 8 | 0.8 | 2.5 | 150 | 1.8 | 400 | | | | | | | |
| 9 | 0.7 | 2.4 | 140 | 1.8 | 350 | | | | 97.8 | 0.07 | 1.3 | 61.0 |
| 10 | 0.7 | 2.5 | 140 | 1.8 | 350 | | | | | | | |
| 11 | 0.7 | 2.9 | 140 | 1.8 | 350 | | | | | | | |
| 12 | 0.7 | 2.8 | 140 | 1.8 | 350 | | | | | | | |
| 13 | 0.7 | 2.7 | 140 | 1.8 | 350 | | | | 97.7 | 0.2 | 1.1 | 61.6 |
| 14 | 0.7 | 3.1 | 140 | 1.8 | 350 | | | | | | | |
| 15 | 0.7 | 3.5 | 140 | 1.8 | 350 | | | | | | | |
| 16 | 0.7 | 3.1 | 140 | 1.8 | 350 | | | | | | | |
| 17 | 0.7 | 3.2 | 140 | 1.8 | 350 | | | | 97.3 | 0.5 | 1.4 | 61.6 |
| 18 | 0.66 | 2.6 | 140 | 1.8 | 330 | | | | 97.7 | 0.06 | 1.5 | 61.4 | be further worked up, such as by flaking for use, or it may be first topped in a distillation column to remove acetic acid and then flaked for use. We prefer the latter method, though either is satisfactory.

The following examples are given to more fully illustrate the process of our invention but we do not wish to be limited thereto except as defined in the appended claims.

EXAMPLE 1

Into a round-bottom glass flask equipped with a hydrogen inlet well-line, stirrer, thermometer, electric cone heated controlled by a Variac, and a reflux condenser, were introduced 315 grams of molten commercial monochloroacetic acid containing 3.2 weight percent of dichloroacetic acid and 0.9 percent acetic acid. Five and three tenths grams of deposited catalyst (5 percent palladium on powdered charcoal) were added and the system was purged with a slow stream of nitrogen through the hydrogen inlet. The agitator was started and the temperature raised to 84 degrees centigrade by means of the heater. The nitrogen was then shut off and hydrogen was cautiously introduced into the agitated molten mixture for a period of 6.5 hours at an average rate of about 0.015 gram mole per minute. The gases coming from the reaction were bubbled through an acid trap containing measured amounts of sodium hydroxide in water, and the amount of hydrogen chloride evolved measured therefrom. At Although we have illustrated our invention with particular emphasis being placed upon the reduction of the dichloroacetic acid content of commercial monochloroacetic acid, we do not wish to be limited thereto, for the process of this invention is adaptable to both the reduction of trichloroacetic acid to lower members in the series and to the reduction of dichloroacetic acid in the presence of monochloroacetic acid in general. In accordance with our invention concentrations as high as 99 percent dichloroacetic acid in one percent monochloroacetic acid may be selectively reduced to monochloroacetic acid. By our use of the phrase "commercial monochloroacetic acid" we include within its scope those forms of monochloroacetic acid produced on a large scale which at some stage in their processing contain significant amounts of dichloroacetic acid. Thus, the term "commercial monochloroacetic acid" includes not only products in saleable form, such as flaked monochloroacetic acid, but also includes those crude products resulting from the commercial chlorination of acetic acid or acetic anhydride which are in intermediate stages of preparation in solution, or molten or in the solid state. For example, this invention may be readily adapted into existing facilities for the continuous or batch manufacture of monochloroacetic acid, at a point in the existing plant where the crude monochloroacetic acid is normally in the molten state, such as exists prior to the flaking operation. These forms of monochloroacetic acid usually contain between one and ten percent by weight of dichloroacetic acid and can be treated by the method of the present invention to lower this dichloroacetic acid content.

We claim:

1. The process for selectively reducing the dichloroacetic acid content of a mixture comprising monochloroacetic acid and dichloroacetic acid which comprises: introducing hydrogen gas into the liquid mixture maintained at a temperature between about 60 and about 170 degrees centigrade in the absence of a solvent while in the presence of a catalytic amount of a group VIII noble metal hydrogenation catalyst having an atomic number greater than 43, and recovering the resulting product therefrom.

2. The process of claim 1, wherein the group VIII noble metal hydrogenation catalyst is present in the mixture in an amount between about 0.002 and about 0.5 percent by weight of the mixture.

3. The process of claim 1, wherein between about 1 and 20 percent by weight of the group VIII noble metal hydrogenation catalyst is deposited on an inert carrier and this deposited catalyst is present in the mixture in an amount between about 0.004 and about 10.0 percent by weight of the mixture.

4. The process of claim 3, wherein the group VIII noble metal hydrogenation catalyst is palladium deposited on a finely divided inert carrier.

5. A process for lowering the dichloroacetic acid content of a monochloroacetic acid material which comprises: maintaining said monochloroacetic acid material in the presence of a catalytic amount of a group VIII noble metal hydrogenation catalyst having an atomic number greater than 43, maintaining said monochloroacetic acid material in agitation and at a temperature between about 60 and about 170 degrees centigrade, introducing hydrogen gas into the liquid monochloroacetic acid material in the absence of a solvent, and recovering therefrom a monochloroacetic acid product which is lower in dichloroacetic acid content than the starting monochloroacetic acid material.

6. A process for lowering the dichloroacetic acid content of a monochloroacetic material which comprises: maintaining said monochloroacetic acid material in the presence of between about 0.004 and about 10.0 percent by weight of a deposited catalyst comprising a group VIII noble metal hydrogenation catalyst having an atomic number greater than 43 deposited on an inert carrier, maintaining said monochloroacetic acid material in agitation and at a temperature between about 130 and 150 degrees centigrade, introducing hydrogen gas into the liquid monochloroacetic acid material in the absence of a solvent, and recovering therefrom a monochloroacetic acid product which is lower in dichloroacetic acid content than the starting monochloroacetic acid material.

7. A process for lowering the dichloroacetic acid content of a monochloroacetic acid material which comprises: maintaining the said monochloroacetic acid material in the presence of between 0.004 and about 10.0 percent by weight of a deposited catalyst of palladium on an inert carrier, maintaining said monochloroacetic acid material in agitation and at a temperature between about 130 and 150 degrees centigrade, introducing hydrogen gas into the liquid monochloroacetic acid material in the absence of a solvent, and recovering therefrom a monochloroacetic acid product which is lower in dichloroacetic acid content than the starting monochloroacetic acid material.

8. The process for purifying monochloroacetic acid of its higher chlorinated acids which comprises: maintaining the monochloroacetic acid in agitation in the presence of between about 0.02 and about 2.4 percent by weight of a deposited catalyst of palladium on an inert carrier at a temperature between about 130 and about 150 degrees centigrade, introducing hydrogen gas into the monochloroacetic acid in the absence of a solvent, and recovering the monochloroacetic acid product so produced.

9. The process for selectively reducing the dichloroacetic acid content of a mixture comprising monochloroacetic acid and dichloroacetic acid which comprises: introducing hydrogen gas into the liquid mixture maintained at a temperature between about 130 and about 150 degrees centigrade in the absence of a solvent while the mixture is maintained in agitation and while in the presence of a catalytic amount of a group VIII noble metal hydrogenation catalyst having atomic number greater than 43; and recovering the resulting product therefrom.

References Cited in the file of this patent

UNITED STATES PATENTS

| 2,285,277 | Henke et al. | June 2, 1942 |
| 2,339,685 | De Simo et al. | Jan. 18, 1944 |
| 2,662,861 | Riblett et al. | Dec. 15, 1953 |
| 2,671,803 | Sennewald et al. | Mar. 9, 1954 |

OTHER REFERENCES

Baltzly et al.: JACS, vol. 68, February 1946, pp. 261-5.